(No Model.)
H. BENDER.
GARDEN SEED DRILL.
No. 493,146. Patented Mar. 7, 1893.
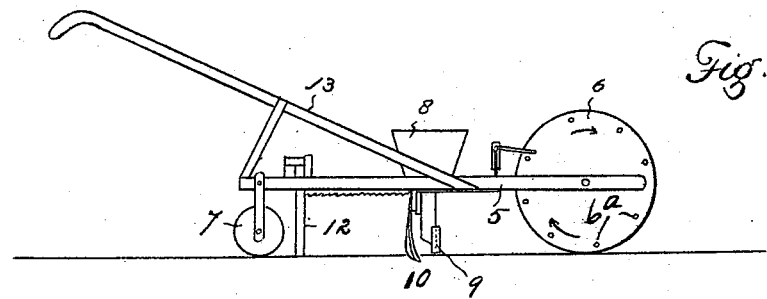
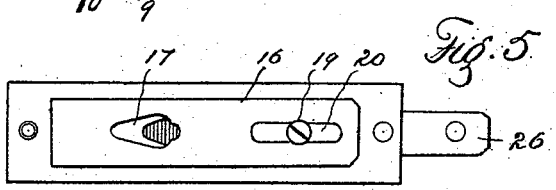
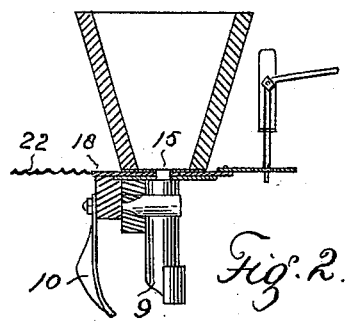
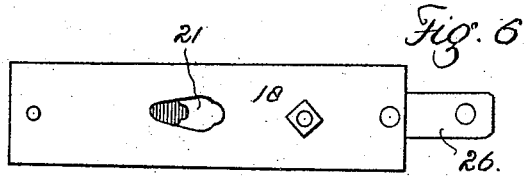
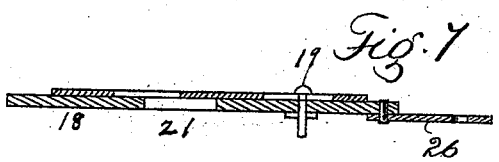
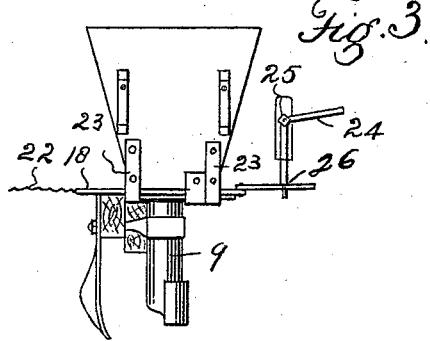
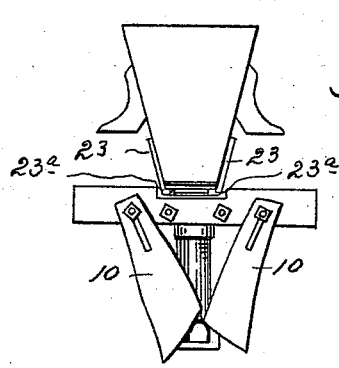
WITNESSES:
G. J. Velaudet
Wm. M. Connell
INVENTOR
Horriet Bender
BY
A. J. O'Brien
ATTORNEY.
THE NORRIS PETERS CO., PHOTO-LITHO., WASHINGTON, D. C.

UNITED STATES PATENT OFFICE.

HARRIET BENDER, OF DENVER, COLORADO.

GARDEN-SEED DRILL.

SPECIFICATION forming part of Letters Patent No. 493,146, dated March 7, 1893.

Application filed June 4, 1892. Serial No. 435,573. (No model.)

*To all whom it may concern:*

Be it known that I, HARRIET BENDER, a citizen of the United States of America, residing at Denver, in the county of Arapahoe and State of Colorado, have invented certain new and useful Improvements in Garden-Seed Drills; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements for seeding machines more specially designed for hand use, as a garden seed-drill, in which case it is propelled by the user who shoves the machine before him.

The object of the invention is to provide a device of the class which shall be simple in construction, economical in cost, reliable, durable and efficient in use and in which the seed dropping mechanism shall be so arranged that perfect adjustment is assured.

To these ends the seeder consists of the features, arrangements and combinations hereinafter described and claimed, and will be fully understood by reference to the accompanying drawings in which is illustrated an embodiment thereof.

In the drawings, Figure 1 is a side elevation of the complete machine. Fig. 2 is a vertical section taken through the seed-box and its attachments. Fig. 3 is a side elevation of the same. Fig. 4 is a rear elevation of this mechanism. Fig. 5 is a top or plan view of the adjustable plates whereby the distribution or dropping of the seed from the box is regulated and controlled. Fig. 6 is an underneath view of this mechanism. Fig. 7 is a longitudinal section taken through the center of the same.

Similar reference characters indicating corresponding parts or elements of the mechanism, let the numeral 5 designate the framework of the machine, 6 and 7 the front and rear rollers, 8 the seed box, 9 the spout leading therefrom, 10 the covering shovels, 12 the marker, and 13 the handle secured to the framework.

In the bottom of the seed box is an opening 15 which is normally closed by a plate 16 having an aperture 17, which aperture, at regular intervals during the operation of the machine, is brought directly beneath the opening 15 in the bottom of the box, allowing seeds to escape according to the size of the aperture 17, which is controlled by another plate 18 lying underneath plate 16 and attached thereto by a set screw 19 which passes through a slot 20 formed in plate 16 and enters an aperture formed in plate 18, being secured by a nut underneath. Plate 18 is provided with an opening 21. It will thus be seen that by the adjustment of plate 16 upon plate 18, the size of the opening available for seed dropping purposes may be regulated at pleasure.

Plates 16 and 18 are normally held in a position to close the opening in the seed box by a coil spring 22 attached in front of the rear extremity of plate 18, its opposite extremity being secured to a stationary part of the framework. Plates 16 and 18 are movably attached to the box by the depending metal straps 23 secured to the sides of the box and interiorly flanged as shown at 23ª to engage the under surface of plate 18 whereby said plate and its attachments are slidingly supported in position in suitable proximity to the bottom of the box. Plate 18 is actuated by a bell-crank lever 24 fulcrumed on the framework at 25. One arm of this lever engages an apertured projection 26 secured to plate 18 while the other arm lies in the path of pins 6ª located at intervals on roller 6 whereby as the machine is moved forward and wheel or roller 6 rotated in the direction indicated by the arrows, the lever 24 is actuated by the pins 6ª in succession and plates 16 and 18 alternately drawn forward and released, the forward movement being sufficient to bring the opening 17 directly below the opening 15 in the seed-box, permitting some of the seed to escape from the box. These seeds pass through spout 9 into a suitable trench which said spout forms in the earth as the machine is moved along. The seeds which are dropped in hills—located at intervals determined by the distance apart of pins 6ª, are covered by the shovels 10, while the ground is smoothed down on top by the rear roller 7.

Having thus described my invention, what I claim is—

1. In a seeder the combination of the frame, the apertured seed-box supported thereon, the flanged metal straps attached thereto, the adjustable two-part apertured movable slide supported by said straps, a spring attached to the rear extremity of the slide, a bell-crank lever directly connected with its forward extremity, and a rotating wheel or drum carrying pins adapted to engage one arm of said lever whereby the slide is alternately drawn forward and released, substantially as described.

2. In a seeder the combination with a suitable frame, of a seed-box supported thereon, having an apertured bottom and provided with metal straps attached to its sides, said straps carrying interiorly projecting flanges extending below the bottom of the box, a slide consisting of two apertured plates adjustably connected and slidingly supported by the flanged straps, and actuating mechanism for the slides consisting of a bell crank lever fulcrumed on the frame in front of the seed box and having one arm directly connected with one extremity of the slide, a rotating wheel or drum having pins engaging the other arm of the lever and giving the slide its forward movement, and a spring attached to the slide in the rear of the box and imparting the reverse movement, substantially as described.

In testimony whereof I affix my signature in presence of two witnesses.

HARRIET BENDER.

Witnesses:
ÆTNA HARDIN,
CYRUS CHAPIN.